UNITED STATES PATENT OFFICE.

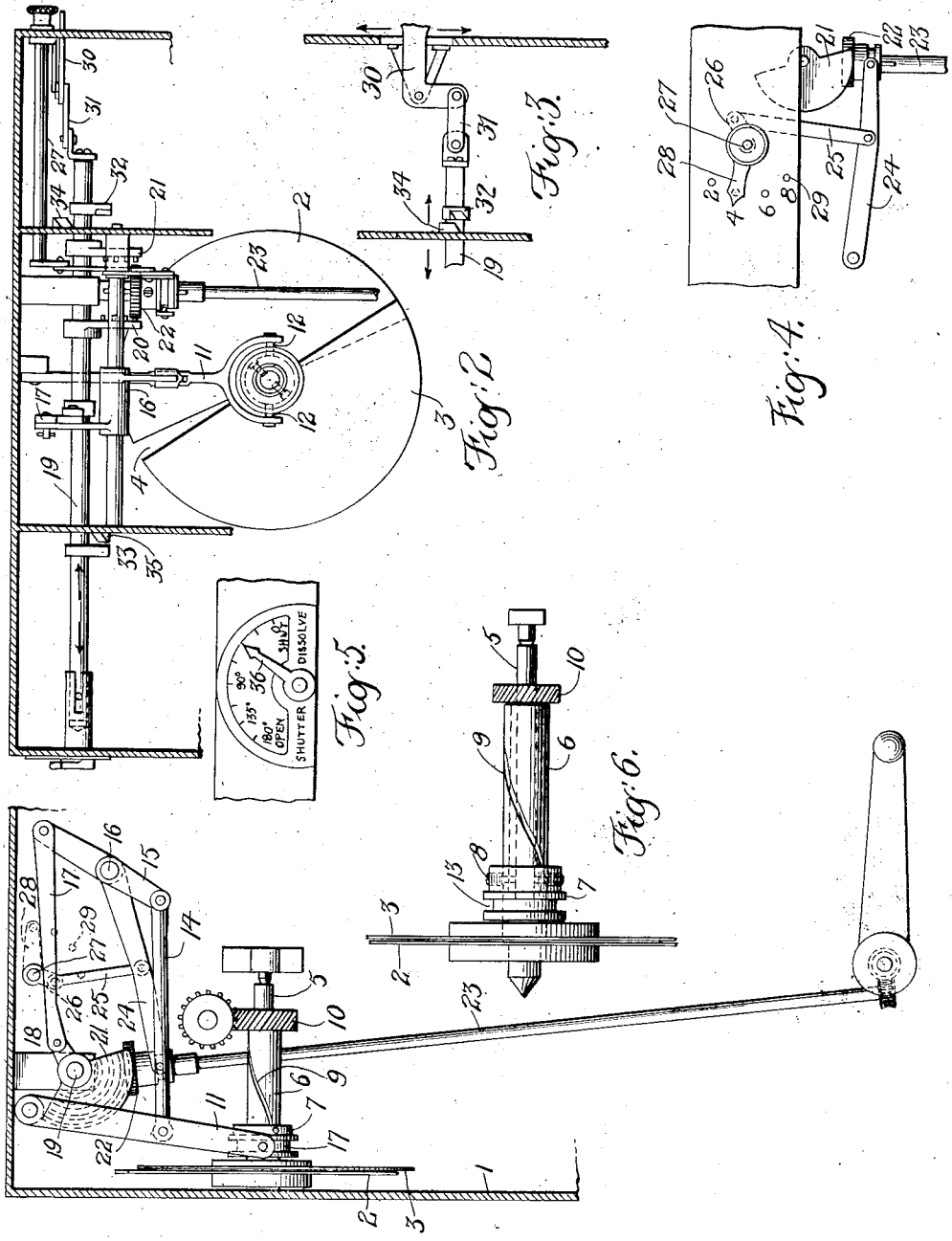

GEORGE R. STRINGHAM, OF NEW YORK, N. Y., ASSIGNOR, BY MESNE ASSIGNMENTS, TO MARTIN V. KELLEY, TRUSTEE, OF NEW YORK, N. Y.

MOTION-PICTURE CAMERA.

1,362,199. Specification of Letters Patent. Patented Dec. 14, 1920.

Application filed December 12, 1917. Serial No. 206,763.

*To all whom it may concern:*

Be it known that I, GEORGE R. STRINGHAM, a citizen of the United States, and a resident of the borough of Manhattan, city, county, and State of New York, and having a post-office address at No. 512 West 132nd street, New York, have invented certain new and useful Improvements in Motion-Picture Cameras, of which the following is a specification.

My invention relates to various new and useful improvements in motion picture cameras, and particularly to the mechanism for actuating the shutter by which, as well known, the light is cut off from the film during the periods of movement thereof.

With the development of the motion picture art it has been found necessary to equip cameras with means by which so-called "dissolving effects" are secured. To this end the cameras are provided with shutters, by which the light opening may be gradually opened or closed. Usually the maximum shutter opening is 180° and in securing the dissolving effect this opening is gradually reduced until it is entirely closed. With my improved camera, I provide shutter mechanism of simple and substantial character by which dissolving effects can be secured automatically as the camera operates. I also provide mechanism by which the speed of opening or closing of the shutter may be predetermined, thereby permitting a fade out or fade in to be secured in two, four, six and eight feet of film, respectively, or such other lengths of film as may be desired. This permits the operator to very greatly extend the capacity of the camera since these effects can be varied and can be made either slow or rapid as may be desired.

In order that my invention may be better understood attention is directed to the accompanying drawings forming a part of this specification, in which Figure 1 is a side elevation of my improved shutter mechanism, Fig. 2 a front elevation of the same partly in section, Fig. 3 a detail sectional view of the preferred tripping mechanism by which the shutter actuating mechanism is controlled, Fig. 4 a detail view showing the pointer for determining the speed with which the shutter actuating mechanism is to be operated, Fig. 5 a detail view showing the index by which the position of the shutter parts is indicated, and Fig. 6 a separate plan view of the shutter showing the sleeve for moving the shutter parts relatively.

In these views corresponding parts are represented by the same numerals of reference.

1 represents the camera casing provided with the usual film boxes, lens tube and film feeding devices, which may be of any suitable and improved construction. The shutter which cuts off the light during the periods of movement of the film is composed of two halves 2 and 3 mounted so as to rotate as a whole but capable of independent movement with respect to each other so as to vary the extent of the opening 4 in the usual way. One section 2 is carried directly on the shutter shaft 5 and the other section 3 is carried on the sleeve 6 which is mounted on said shaft. Mounted on the sleeve 6 is a sliding collar 7 having two pins 8 which engage spiral slots 9 in the sleeve 6, so that by moving the collar 7 longitudinally the sleeve 6 will be turned with respect to the shaft 5 so as thus to move the shutter segments with respect to each other and open or close the shutter opening. The sleeve 7 turns with the shaft 5, but is movable longitudinally with respect to said shaft, and to this end one or both of the pins 8 engages a longitudinal slot or groove in said shaft, as shown in dotted lines in Fig. 6. The shaft 5 is driven by gears 10 from the crank handle of the camera in synchronism with the film feeding mechanism in any suitable way. The collar 7 is moved longitudinally by a lever 11, having a yoke at its lower end provided with pins 12 working in the groove 13 in said collar. The lever 11 connects by a link 14 to a lever 15 mounted on the pivot 16 and whose upper end is connected by a link 17 to a crank 18 on the rock shaft 19. Said rock shaft carries two segments 20 and 21 spaced a short distance apart and the inner face of each of which is provided with four sets of concentric teeth as shown. A gear 22 is located between the segments 20 and 21 and is normally out of engagement with the gear teeth thereon. This gear 22 is mounted on a shaft 23 to which continuous rotating movement is imparted and the gear is capable of being longitudinally moved on the shaft to which it is splined, so as to engage with any one of the gear teeth on the segment 20 or 21. This movement of the gear 22 longitudinally on the shaft 23 is effected by means of a lever 24 whose forked inner end engages a groove on the boss or shank of the gear 22 and whose outer end is pivoted concentrically with the pivot 16. This lever 24 may be operated in any suitable way, preferably by a link 25 connected to a crank 26 on a shaft 27 extending on the outside of the camera where it is provided with an indicator or pointer 28 made of spring metal, and whose free end is adapted to engage with any one of a number of openings 29 indicating the speed with which the dissolving effect is to be secured. The shaft 19 is arranged to be moved longitudinally to engage one or the other of the segments 20 or 21 with the gear 22. This movement is secured in any suitable way, preferably by a lever 30, extending outside of the camera case and connected by a universal joint 31 to the end of the rock shaft 19. Two cams 32 and 33 are carried by the rock shaft and are so arranged that when the rock shaft reaches the end of its movement to fully open and close the shutter, one of the cams will engage a fixed stud 34 or 35, whereby the rock shaft will be moved longitudinally so as to automatically disengage the segment 20 or 21 from the gear 22 and thus arrest the turning movement of the rock shaft 19 which effects the relative movement of the shutter section 3 with respect to the section 2. A finger or indicator 36 on the free end of the shaft 19, coöperates with a suitable scale on the outside of the camera casing, as shown in Fig. 5, thereby showing at all times to the operator the position of said shaft and hence the relationship of the shutter sections to each other.

In operation, when the camera is operating normally, the gear 22 occupies a midway position between the segments 20 and 21 so that the turning of the gear will operate neither of said segments. The shutter will therefore operate in the usual way. When it is desired to secure a dissolving effect the operator first determines what the speed shall be. If he decides that the effect shall be very rapid, he operates the finger piece 28 so as to elevate the gear 22 to its uppermost position thereby engaging the uppermost or shortest line of gear teeth on the segment 20 or 21. He now moves the lever 30 on the outside of the camera case so as to shift the rock shaft 19 and cause one or the other of the segments 20 or 21 to engage the gear 22. As the gear 22 rotates it therefore will swing the segment and rock the shaft 19 at a speed dependent upon the gear ratio. The rocking of the shaft 19 causes the crank 18 to swing and through the links 14 and 17 and lever 15, the sliding collar 7 will be moved longitudinally to thereby shift the sleeve 6 with respect to the shaft 5 and thus open or close the shutter at the predetermined speed. When the movement has been completed one or the other of the cams 32 or 33 comes into play to shift the rock shaft 19 sidewise and disengage the gear 22 from the segment which it actuated. To reverse the movement of the shutter sections, the finger piece 30 is operated to shift the rock shaft 19 in the opposite direction, causing the other segment to engage with the gear 22, the rotation of which partially rotates the rock shaft in the opposite direction and returning the shutter sections to their former position.

Having now described my invention, what I claim as new therein and desire to secure by Letters Patent, is as follows:

1. In a motion picture camera, the combination with a two part rotary shutter, the parts of which are adapted to move relatively, of mechanism for moving said parts to open or close the light opening, means for manually bringing said mechanism into operative condition, and means coördinated with the film feed for automatically arresting the mechanism when the shutter parts have completed their full open or full closed movement, substantially as set forth.

2. In a motion picture camera, the combination with a two part rotary shutter, whose parts are adapted to move relatively to open or close the light opening, of mechanism for moving said parts relatively, said mechanism being normally disengaged, means for manually engaging said mechanism to move the shutter parts relatively, and means coördinated with the film feed for automatically arresting the movement of the shutter parts when in their full open or full closed position, substantially as set forth.

3. In a motion picture camera, the combination of a two part rotary shutter, whose parts are adapted to move relatively to open or close the light opening, a pair of opposed toothed segments connected with the shutter to move the parts thereof relatively, a driving gear between the segments and normally out of mesh with both of the same, and means to engage said gear with one or the other of said segments to effect relative movement of the shutter parts, substantially as set forth.

4. In a motion picture camera, the combination of a two part rotary shutter whose parts are adapted to move relatively to open or close the light opening, a pair of opposed toothed segments connected with the shutter to move the parts thereof relatively, a driving gear between the segments and normally out of mesh with both of the same, means to engage said gear with one or the other of said segments to effect relative movement of the shutter parts, and means for automatically disengaging the gear from the segment when the shutter parts have completed their relative movement, substantially as set forth.

5. In a motion picture camera, the combination of a two part rotary shutter, whose parts are adapted to move relatively to open or close the light opening, two opposed toothed segments connected with the shutter for moving said parts relatively to each other, a fixed gear located between the segments but normally out of mesh with both of the same and means for moving the segments manually to cause one or the other to engage with said gear, substantially as set forth.

6. In a motion picture camera, the combination of a two part rotary shutter, whose parts are adapted to move relatively to open or close the light opening, two opposed toothed segments connected with the shutter for moving said parts relatively to each other, a fixed gear located between the segments but normally out of mesh with both of the same, means for moving the segments manually to cause one or the other to engage with said gear, and means for automatically shifting the segments to arrest movement thereof when the shutter parts have been moved to their full open or full closed position, substantially as set forth.

7. In a motion picture camera, the combination of a two part rotary shutter whose parts are adapted to move relatively to open or close the light opening, a segment connected with the shutter parts and adapted to move them relatively, a plurality of sets of concentric teeth on said segment, and a driving gear adapted to engage with any one of said sets of teeth whereby the relative speed in opening or closing the shutter opening may be varied, substantially as set forth.

8. In a motion picture camera, the combination with a two part rotary shutter whose parts are adapted to be moved relatively to open or close the light opening, of a segment connected with the shutter parts to move them relatively, a plurality of sets of concentric teeth on the segment, a gear adapted to be brought into mesh with any one of said sets of teeth to operate the segment at the desired speed, and means to automatically disengage the segment and gear when the shutter parts have moved to their full open or full closed position, substantially as set forth.

9. In a motion picture camera, the combination of a two part rotary shutter whose parts are adapted to be moved relatively to open or close the light opening, a pair of segments each formed with a plurality of sets of concentric teeth, a gear centrally arranged between the segments and normally out of mesh with the same, means for moving the gear to bring it into line with any one of the sets of teeth, and means for engaging the gear with either of said segments whereby the shutter parts will be opened or closed at a predetermined speed, substantially as set forth.

10. In a motion picture camera, the combination of a two part rotary shutter whose parts are adapted to be moved relatively to open or close the light opening, a pair of segments each formed with a plurality of sets of concentric teeth, a gear centrally arranged between the segments and normally out of mesh with the same, means for moving the gear to bring it into line with any one of the sets of teeth, means for engaging the gear with either of said segments, whereby the shutter parts will be opened or closed at a predetermined speed, and means for disengaging the segments and gear when the shutter parts are moved to their full open and full closed position, substantially as set forth.

11. In a motion picture camera, the combination of a two part rotary shutter whose parts are movable relatively to open or close the light opening, a pair of segments having a plurality of opposed sets of concentric teeth, a driving gear arranged between the segments and normally out of mesh with the same, means for adjusting said gear to bring it into line with any one of said sets of teeth, and means for shifting the segments to engage either one with said gear, whereby the shutter parts will be opened or closed at a predetermined speed, substantially as set forth.

12. In a motion picture camera, the combination of a two part rotary shutter whose parts are movable relatively to open or close the light opening, a pair of segments having a plurality of opposed sets of concentric teeth, a driving gear arranged between the segments and normally out of mesh with the same, means for adjusting said gear to bring it into line with any one of said sets of teeth, means for shifting the segments to engage either one with said gear, whereby the shutter parts will be opened or closed at a predetermined speed, and means for automatically shifting the segments to their normal position to disengage the same from said gear when the shutter parts have moved to their full open or full closed position, substantially as set forth.

13. A shutter mechanism embodying a pair of movable leaves spacedly adjustable with relation to each other, driving means for the leaves, and means actuated from said driving means to change the relative positions of the leaves during their movement by said driving means.

14. A shutter mechanism, embodying a pair of movable leaves spacedly adjustable with relation to each other, driving means for the leaves, and means to change the relative positions of the leaves during their movement by said driving means, so as to vary the opening between the leaves synchronously with the movement of the leaves and by an amount which bears a certain predetermined ratio to the instant opening between the leaves.

15. A shutter mechanism, embodying a pair of rotatable and rotatably adjustable leaves; driving means for the leaves, and means actuated from said driving means to change the relative positions of the leaves by a constant angle in synchronism with their rotation by the driving means.

16. Cinematographic apparatus comprising a main shutter having a light opening therein, an auxiliary shutter for varying the effective opening in the main shutter, driving means for continuously moving the two shutters in synchronism recurrently to shutter the transmission of light, adjusting means actuated by the driving means for moving the auxiliary shutter relatively to the main shutter while the shutters are in operation, thereby to vary the effective opening in the main shutter, and means for automatically disengaging the adjusting means from the driving means when the effective opening has been varied a predetermined amount, whereby the effective opening is then maintained constant.

This specification signed and witnessed this 30th day of October, 1917.

GEORGE R. STRINGHAM.

Witnesses:
 A. E. RENTON,
 JOSEPHINE G. McDERMOTT.